US012756589B2

(12) United States Patent
Shim et al.

(10) Patent No.: US 12,756,589 B2
(45) Date of Patent: Oct. 6, 2026

(54) SYSTEMS AND METHODS FOR CREATION AND APPLICATION OF INTERACTION ANALYTICS

(71) Applicant: Read AI, Inc., Seattle, WA (US)

(72) Inventors: David Shim, Seattle, WA (US); Elliott Waldron, Seattle, WA (US); Robert Williams, Seattle, WA (US)

(73) Assignee: Read AI, Inc., Seattle, WA (US)

( * ) Notice: Subject to any disclaimer, the term of this patent is extended or adjusted under 35 U.S.C. 154(b) by 79 days.

(21) Appl. No.: 18/830,502

(22) Filed: Sep. 10, 2024

(65) Prior Publication Data

US 2024/0430118 A1 Dec. 26, 2024

Related U.S. Application Data

(63) Continuation of application No. 17/838,158, filed on Jun. 10, 2022, now Pat. No. 12,107,699, which is a continuation-in-part of application No. 17/692,555, filed on Mar. 11, 2022, now Pat. No. 11,799,679.

(51) Int. Cl.
*H04L 12/18* (2006.01)
*H04N 7/14* (2006.01)

(52) U.S. Cl.
CPC ...... *H04L 12/1831* (2013.01); *H04L 12/1818* (2013.01); *H04L 12/1822* (2013.01); *H04N 7/147* (2013.01)

(58) Field of Classification Search
None
See application file for complete search history.

(56) References Cited

U.S. PATENT DOCUMENTS

| | | | |
|---|---|---|---|
| 7,298,930 B1 | 11/2007 | Erol et al. | |
| 10,268,660 B1 | 4/2019 | Arazi | |
| 10,572,778 B1 | 2/2020 | Robinson et al. | |
| 11,556,754 B1 * | 1/2023 | Ramanarayanan | G06F 16/22 |
| 2014/0282089 A1 | 9/2014 | West et al. | |
| 2015/0046233 A1 | 2/2015 | Srulowitz et al. | |
| 2015/0213389 A1 * | 7/2015 | Modarresi | G06Q 10/06393 705/7.39 |
| 2016/0048546 A1 * | 2/2016 | Weisman | G06F 40/30 707/748 |
| 2016/0073054 A1 | 3/2016 | Balasaygun et al. | |
| 2017/0236081 A1 * | 8/2017 | Grady Smith | G06Q 10/0637 705/7.36 |
| 2017/0357988 A1 * | 12/2017 | Paulsen | G06Q 30/0204 |

(Continued)

FOREIGN PATENT DOCUMENTS

| | | | |
|---|---|---|---|
| WO | 2019246239 A1 | 12/2019 | |
| WO | 2020206487 A1 | 10/2020 | |

*Primary Examiner* — Phyllis A Book
(74) *Attorney, Agent, or Firm* — Ashurst Perkins Coie US LLP

(57) ABSTRACT

A method comprises receiving at least one of a transcript, a video recording, an audio recording, or an audiovisual recording of at least a portion of an interaction, and receiving an audiovisual score for a relevant portion of the interaction, the received audiovisual score being based on data received from at least a subset of participants in the interaction. A reaction metric is calculated based on the received audiovisual score. The at least one transcript, video recording, audio recording, or audiovisual recording is then displayed proximate to the reaction metric.

20 Claims, 8 Drawing Sheets

(56) References Cited

U.S. PATENT DOCUMENTS

| | | | | |
|---|---|---|---|---|
| 2018/0025093 | A1* | 1/2018 | Xia | G06F 16/9024 707/602 |
| 2018/0025303 | A1 | 1/2018 | Janz | |
| 2018/0336902 | A1 | 11/2018 | Cartwright et al. | |
| 2019/0074987 | A1* | 3/2019 | Wiener | G06Q 10/10 |
| 2019/0138597 | A1* | 5/2019 | Dowell | H04L 65/4025 |
| 2019/0213522 | A1 | 7/2019 | Cong et al. | |
| 2020/0118458 | A1* | 4/2020 | Shriberg | G10L 25/66 |
| 2020/0294528 | A1* | 9/2020 | Perri | G06F 3/167 |
| 2020/0380468 | A1 | 12/2020 | Crawford et al. | |
| 2020/0403817 | A1 | 12/2020 | Daredia et al. | |
| 2021/0042854 | A1 | 2/2021 | Hazy et al. | |
| 2021/0058264 | A1 | 2/2021 | Fahrendorff et al. | |
| 2021/0076002 | A1 | 3/2021 | Peters et al. | |
| 2021/0264162 | A1 | 8/2021 | Reece et al. | |
| 2021/0271864 | A1* | 9/2021 | Litvin | G06V 10/764 |
| 2021/0361227 | A1 | 11/2021 | Chou et al. | |
| 2021/0383416 | A1* | 12/2021 | Treiser | G06F 16/288 |
| 2021/0397847 | A1* | 12/2021 | Jayaram | H04N 21/21805 |
| 2022/0014571 | A1 | 1/2022 | Polish et al. | |
| 2022/0078366 | A1 | 3/2022 | Dasdan et al. | |
| 2022/0157058 | A1* | 5/2022 | Raethke | G06V 10/85 |
| 2022/0180181 | A1* | 6/2022 | Yang | G06F 18/217 |
| 2022/0198779 | A1 | 6/2022 | Saraee et al. | |
| 2022/0208155 | A1 | 6/2022 | Ivers et al. | |
| 2022/0210514 | A1 | 6/2022 | Mcbeth et al. | |
| 2022/0217445 | A1 | 7/2022 | Nolan et al. | |
| 2023/0028059 | A1 | 1/2023 | Shelton et al. | |
| 2023/0097628 | A1* | 3/2023 | Zeltyn | G06F 18/24323 714/37 |

* cited by examiner

SYSTEMS AND METHODS FOR CREATION AND APPLICATION OF INTERACTION ANALYTICS

CROSS-REFERENCE TO RELATED APPLICATION(S)

This application is a continuation of U.S. patent application Ser. No. 17/838,158, titled "Systems and Methods for Creation and Application of Interaction Analytics," filed on Jun. 10, 2022, which is a continuation-in-part of U.S. patent application Ser. No. 17/692,555, titled "Systems and Methods for Creation and Application of Interaction Analytics," filed Mar. 11, 2022, now U.S. Pat. No. 11,799,679, issued on Oct. 24, 2023, each of which are incorporated by reference herein in its entirety.

BACKGROUND

In a world where work environments are becoming increasingly remote, work meetings, the backbone of many employees' days, are relying more and more on video and audio interactions via video and audio feeds such as (but not limited to) video conferencing. Video conferencing, however, presents problems in participant engagement, participant morale, and employee productivity, and such problems can adversely affect the quality of not only an existing meeting, but of future meetings as well.

Multiple reasons exist for these problems. First, users participating on video monitors find it difficult to understand the more subtle forms of feedback they receive via a computer monitor, and so they cannot tell the extent to which a meeting is proceeding effectively. And once the meeting ends and participants log off from their video conferencing software, a meeting leader is unable to ask for immediate feedback to determine how a meeting was seen by the participants. In addition, a majority of meetings now have more than seven attendees, and so the ability to review and analyze each participant manually is extremely limited, even if the participant is adept at picking up on and understanding social cues through a video monitor.

A number of companies exist that provide transcription services for the audio part of meetings that can then recap the exact words spoken, along with the action items determined at the meeting. Using computer models, they are able to diarize conversations as well to assign voices to people. Examples of these types of companies include Otter.ai, Fireflies.ai, Gong, and Chorus.ai, but are not good at recognizing social cues or determining the type and degree of participant engagement, and so cannot provide meaningful feedback for improving future meetings.

Thus, a need exists to enable meeting participants and meeting organizers to gauge in real time as well as post interaction how the meeting is going, and how the meeting went.

SUMMARY

Embodiments of the present invention involve systems and methods of improving or adjusting interactions, in real time or in the future, using analytics gleaned from an interaction. In an embodiment, a method comprises receiving an interaction record that can be at least one of a transcript, a video recording, an audio recording, or an audiovisual recording of at least a portion of an interaction. An audiovisual score is received for a relevant portion of the interaction, the received audiovisual score being based on data received from at least a subset of participants in the interaction. A reaction metric is calculated based on the received audiovisual score for a portion of the interaction, and is displayed proximate to the relevant portion of the interaction record. The metric and the display can be configured to be used in decision making related to an interaction.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

One or more of the systems and methods described herein describe a way of providing a system and method for noninvasive searches. As used in this specification, the singular forms "a" "an" and "the" include plural referents unless the context clearly dictates otherwise. Thus, for example, the term "a computer server" or "server" is intended to mean a single computer server or a combination of computer servers. Likewise, "a processor," or any other computer-related component recited, is intended to mean one or more of that component, or a combination thereof.

Embodiments of the invention include generation of meeting-relevant interaction models based on a fusion of sensing inputs, including both video and audio inputs. More specifically, embodiments of the invention can include receiving audiovisual data from an interaction, and sending those received inputs to be analyzed according to various models for some or all of a variety of factors, including (but not limited to) face sentiment, laughing, text sentiment, face orientation, face movement, video on/off status, and talking status. Once those models operate on the received data, each factor is given a score by the model. The scores are then aggregated or combined to provide a sentiment score or an engagement score that pertains to a participant (or participants), or that pertains to the meeting itself. Once the scores are combined, in an embodiment, metrics, alerts or recommendations can be fed back to a user, who may be a participant, or who may not be a participant in the interaction.

In addition, in an embodiment, the meeting score can be fed into a model for a variety of additional analyses including a realtime analysis of an interaction, a post-interaction analysis for analysis of a specific interaction, a longitudinal analysis that can compare the score of an interaction with scores from historical interactions (for example, but not the only example, a series of team meetings), or can include that score in the aggregate score from historical interactions, and also an enterprise analysis, which can provide an analysis of the meeting to other meetings within the enterprise, or can include that score in the aggregate score from meetings within a single enterprise. In an embodiment, these additional analyses can be used to better understand the interaction or set of interactions (as applicable), and can be used to generate metrics, alerts, and recommendations that can be stored and/or sent to a user.

Figure 1:
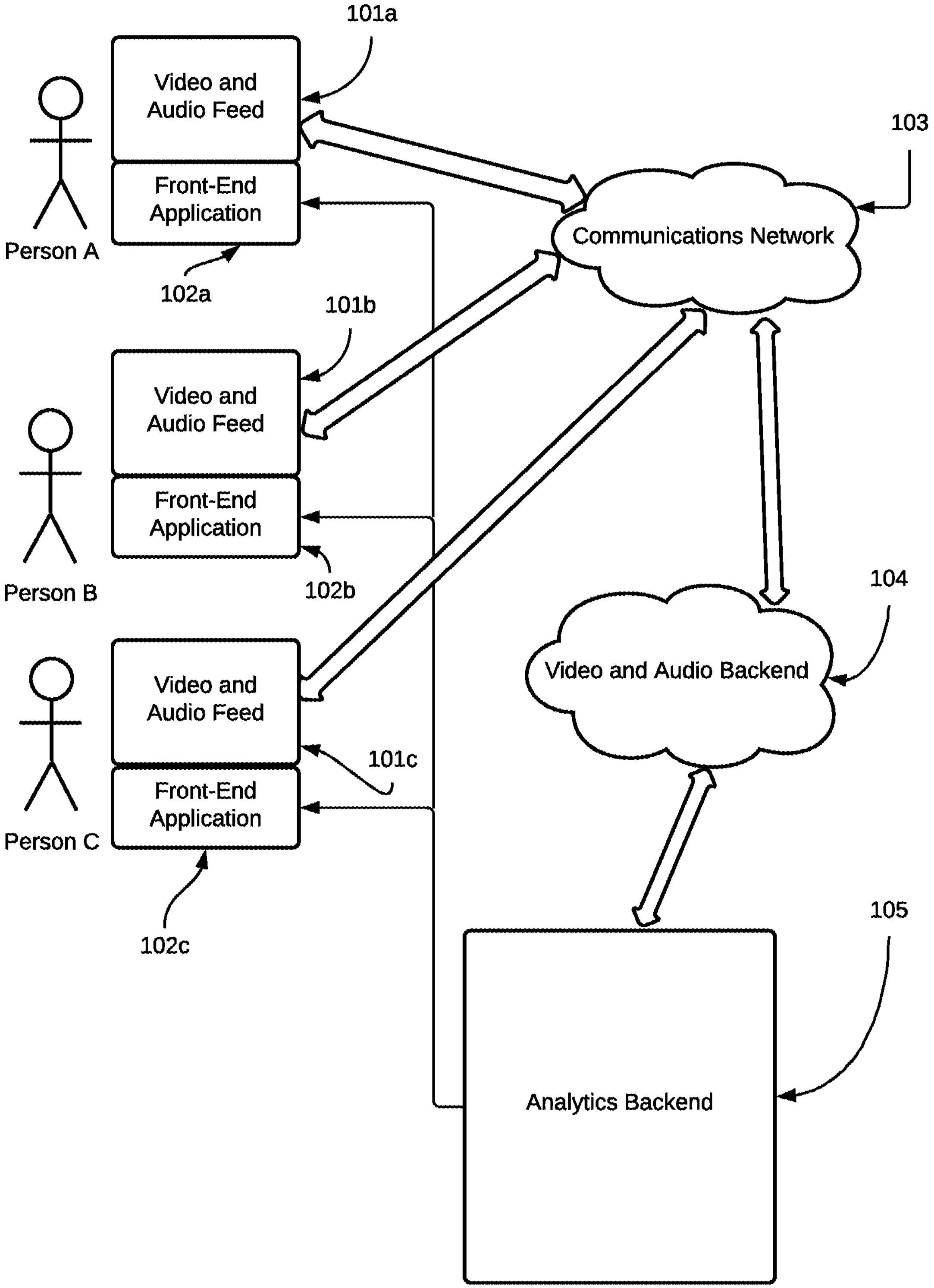
FIG. 1 is a block diagram of a system for providing a systems and method for creation and application of interaction analytics, according to an embodiment of the invention.

FIG. 1 is a block diagram of a system for providing a systems and method for creation and application of interaction analytics in the context of a video and audio feed, according to an embodiment of the invention. In an embodiment, the users are connected to one another via a communication network such as the Internet. In the interaction shown in FIG. 1, persons A, B, and C are each connected to communications network 103 via interaction applications 101*a*, 101*b*, and 101*c*, respectively. Through such network 103, they are each connected to one another via interaction backend 104.

Interaction applications 101*a*, 101*b*, and 101*c* can be, for example, any computer-based application for a video and audio feed (for example, but not the only example, a video conferencing application) in which the application collects audio or video or audiovisual data. One skilled in the art will understand that for the purpose of the present invention, an interaction can be a video & audio feed, a video conference, a telephone call, a live conversation or meeting (in which case video and audio backend 104 connecting the various participants in the interaction may not be necessary).

In the case of a video and audio feed among the various users (in this case, Persons A, B, and C), communication network 103 can be any communications network configurable to allow an interaction (e.g., a video conference) among a plurality of users, and to allow the plurality of users (e.g., Persons A, B, and C) to communicate with video and audio feed backend 104. Communication network 103 can be any network or combination of networks capable of transmitting information (e.g., data and/or signals) and include, for example, a telephone network, an Ethernet network, a fiber-optic network, a wireless network, and/or a cellular network. In some embodiments, communication network 103 can include multiple networks operatively coupled one to another by, for example, network bridges, routers, switches and/or gateways. For example, video and audio feed applications 101*a*, 101*b*, and 101*c* can be operatively coupled to a cellular network, an Ethernet network, or a fiber-optic network. The cellular network, Ethernet network and fiber optic network can each be operatively coupled to one to another via one or more network bridges, routers, switches and/or gateways such that the cellular network, the Ethernet network and the fiber-optic network are operatively coupled to form a communication network. Alternatively, for example, the cellular network, the Ethernet network, and the fiber-optic network can each be operatively coupled to the Internet such that the cellular network, the Ethernet network, the fiber-optic network and the Internet are operatively coupled to form a communication network.

As stated above, to complete the interaction, the users are connected to one another via a video and audio feed 104, which can act as a hub for providing audio data, video data, or audiovisual data to each of Persons A, B, and C to fulfill the interaction.

In an embodiment, video and audio feed backend is in communication with the analytics backend 105, where video and audio data can be passed and analyzed. Once analyzed, certain information about the video and audio is calculated, and the information, which can include alerts or suggestions, are passed back to one or more users to learn more about the video and audio, about the users, and about the meeting itself. In an embodiment, at least one of Persons A, B, and C have a client side interaction application displayed on their device, where the interaction application can display analytics or other messages related to the interaction. In an embodiment, one or two or all of the participants in an interaction may receive messages from the analytics backend 105, or a user who is not shown as taking part in the video and audio may receive the information. In an embodiment, the information is received in real time. In an embodiment, the information is received after the interaction has ended.

Figure 2:
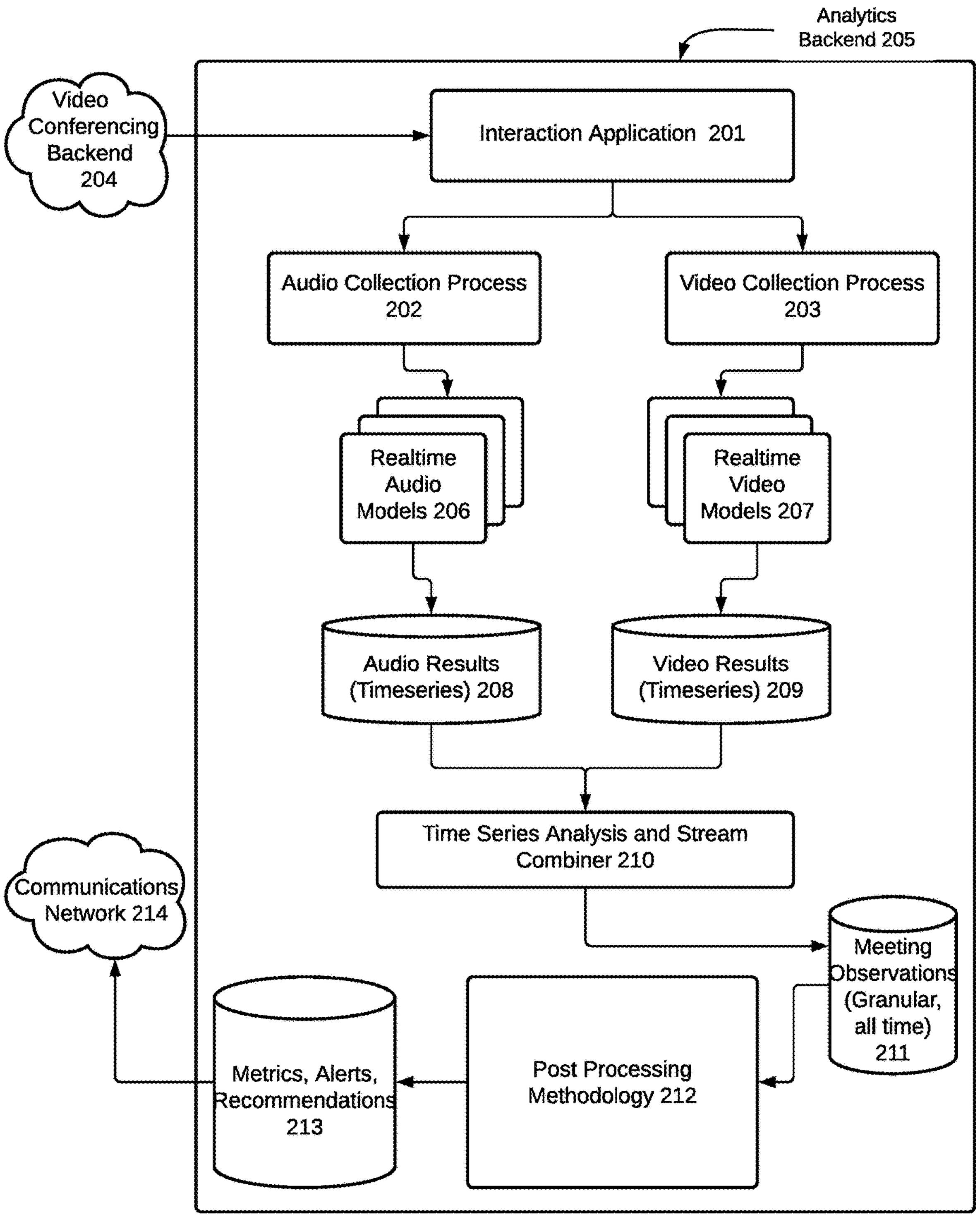
FIG. 2 is a block diagram of system that provides a backend that provides analytics calculations for the system in FIG. 1, according to an embodiment of the invention.

FIG. 2 is a block diagram of system displaying a back end that provides analytics calculations for interactions, according to an embodiment of the invention. In an embodiment, analytics backend 205 receives audiovisual data, which can include a set of audio data (a representation of sound), a set of video data (a representation of images), or a set of both audio and video data. For the purposes of the present invention, one skilled in the art will understand that a set can include data, or can be a null set, including no data. Thus, audiovisual data may be a combination of audio and video data, or may only be audio data, or may only be only video data.

In an embodiment, audiovisual data is received at analytics backend 205 via interaction application 201. Interaction application can be any application that can be used for sending and receiving data into and from (respectively) analytics backend 205. In an embodiment, for audio data received, the interaction application 201 can be configured to play meeting audio through a virtual audio device which is an audio bridge application that transmits audio data from the interaction application 201 to the audio collection process 202. While the audio is playing, a separate process is run that captures discrete windows of audio and transmits them to the realtime audio models 206 for further processing on a processor. In an embodiment, realtime audio models are configured to perform functions including (but not limited to) signal quality analysis, transcription and subsequent textual sentiment analysis, voice prosody analysis, speaker diarization and an analysis of the topic or topics covered in the interaction.

For video data that is received, video data is identified and video collection process 203 and sent to realtime video models 207, which analyze aspects of the audio and video data, to determine certain information about the user. In an embodiment, the interaction application (201) is configured to display the meeting contents on a virtual video display which is a bridge application that transmits video data from interaction application 201 to the video collection process 203. While this video is being displayed on a virtual device, a separate process is run to capture static screenshots at a configurable frequency to produce a sample of the video stream. These static screenshots are then transmitted to the realtime video models (207) for further processing by a processor or processors. In an embodiment, realtime video models 207 are configured to perform functions including, but limited to, video signal quality analysis, facial sentiment and engagement analysis on a viewport-by-viewport basis, and scene parsing, including viewports detection, face detection, name character recognition, mute state, talking state, and platform feedback (e.g., icons). In an embodiment, a viewport is a window (within a video and audio feed display or otherwise) that indicates that presence of one or more participants and may support realtime video of one or more participants.

One skilled in the art will understand that the term "processor" can mean a single component, or multiple components, and the components may be responsible for a variety of functionality within the system. Thus, a processor can be any of a variety and combination of processors, and can be distributed among various types and pieces of hardware, or even across a network. Such processors can be implemented, for example, as hardware modules such as embedded microprocessors, microprocessors as part of a computer system, Application Specific Integrated Circuits (ASICs), and Programmable Logic Devices ("PLDs"). Some such processors can have multiple instruction executing units or cores. Such processors can also be implemented as one or more software modules in programming languages as Java™, C++, C, assembly, a hardware description language, or any other Suitable programming language. A processor according to some embodiments includes media and computer code (also can be referred to as code) specially designed and constructed for the specific purpose or purposes.

For example, the realtime audio models can determine a user's face sentiment (e.g., is the user's face happy, angry, etc.), whether a user is laughing, whether the user's speech reflects certain emotions such as anger, or other sentiments. The realtime video models, for example, can determine a user's face orientation, a user's face movement, whether a user's video is off, whether a user is talking, and others.

In an embodiment, the output of the realtime audio and video models are aggregated into a data structure that can include moment-by-moment estimates of the various model outputs. For example, at the start of a hypothetical finance committee meeting, participants may be casually discussing their weekend plans and sentiment and engagement are measured as high, but once the business of the meeting starts sentiment declines because the topic shifts to poor financial performance.

Once results are received as outputs from the model, they can be stored as time-dependent data in audio database 208 and video database 209, which are operatively coupled to a processor that, from a functional standpoint, acts as a time series analyzer and a stream combiner 210.

Time series analyzer and stream combiner 210 output the combined results of the audio and video analysis (where both audio and video analysis exist), which are then stored in meeting observations database 211, which acts to store the results calculated for that particular interaction. In an embodiment, when only a single channel of audio is available, an additional function of this step is to fuse the video and audio results to enable multimodal speaker diarization (i.e., who spoke when) so that the single audio stream can be assigned to individual participants in an interaction.

In an embodiment, meeting observations database 211 can store results from all or some past interactions, such that the results from a subset of all interactions can be fed into post-processing methodology processor 212 for aggregation and user messaging. Post-processing methodology processor 212 can calculate metrics, alerts, and recommendations to be sent to users. Such metrics, alerts, and recommendations can include participant sentiment, interaction sentiment, interaction engagement, and participant engagement, and can include data from a single ongoing interaction, multiple ongoing interactions, a single historical interaction, or multiple ongoing interaction, or any permutation of such interactions. The various calculated sentiments and engagements can be aggregated into an overall interaction score.

In an embodiment, database 213 is used to store the calculated metrics, alerts and recommendations, ultimately to be sent to a user via network 214.

Figure 3:
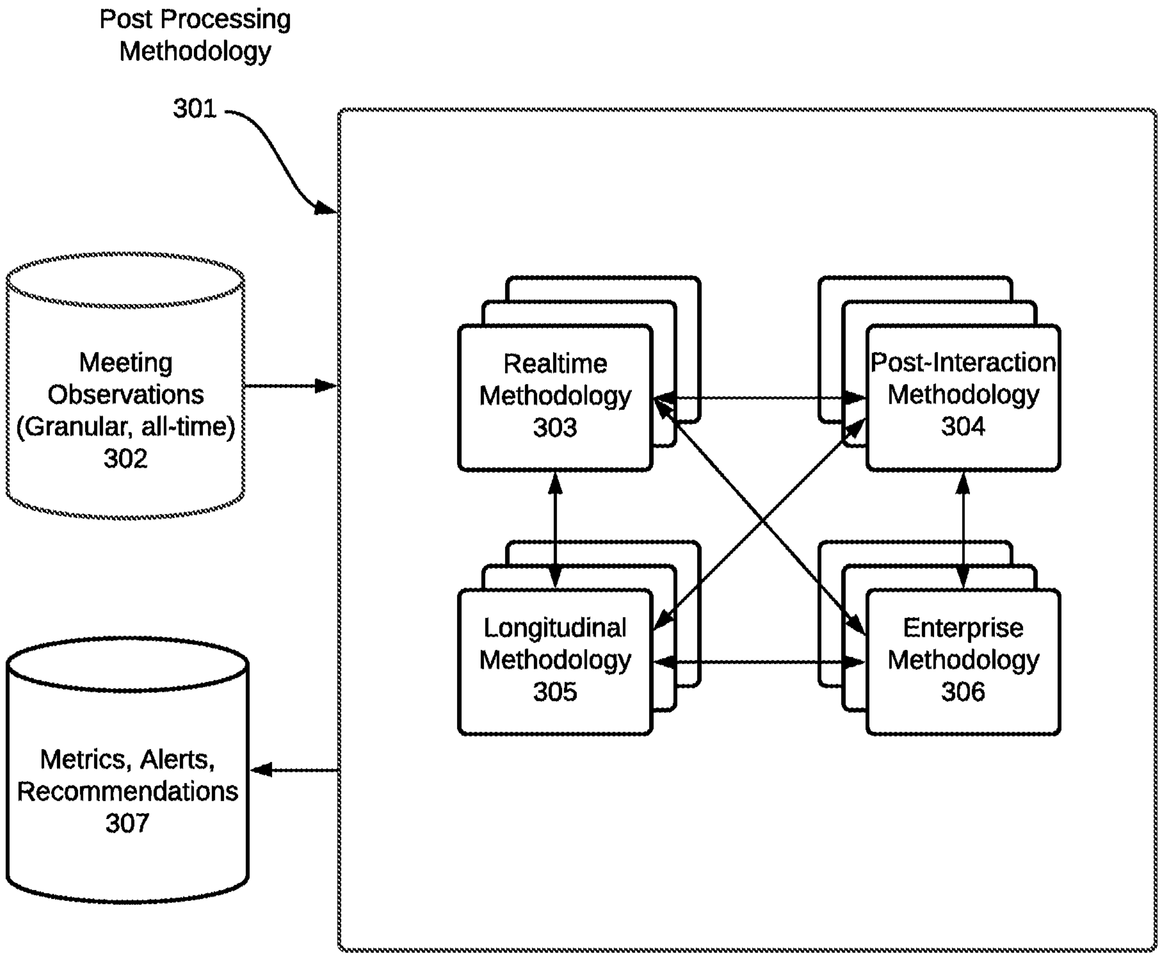
FIG. 3 is a block diagram of a system that provides post processing methodology for the backend in FIG. 2.

FIG. 3 is a block diagram of a system that provides post processing methodology for the back end in FIG. 2. In an embodiment, once the interaction results are received from meeting observations database 302 (which is the same as meeting observations database 211), they can be sent to a processor for aggregation according to the post processing methodology desired.

The post processing module 301 comprises a processor or processors that aggregate meeting observations that can be used to generate metrics, alerts, or recommendations for users. In an embodiment, the processor can apply a realtime methodology 303 that creates metrics, alerts, or recommendations for ongoing interactions in real time. In an embodiment, the processor can apply a post-interaction methodology 304 that generates metrics, alerts, or recommendations for an interaction after the interaction ends. With either the realtime methodology or post-interaction methodology, the aggregation and analysis can be limited to a single meeting, or can be combined by other meetings to generate metrics, alerts, and recommendations that use historical data.

In an embodiment, the post processing methodology 301 can calculate results using a longitudinal methodology 305 to perform a longitudinal analysis of future and past meetings, looking for trends and consistencies that pertain to meeting quality, and that can provide results from comparing interactions from similar meetings, or from a series of meetings. For example, post processing methodology 301 can calculate the efficacy of past sessions of a recurring meeting, and if the metrics are poor, the user can receive a cue or a suggestion related to the cost of keeping such meetings on the calendar.

In an embodiment, the post processing methodology 301 can calculate results using an enterprise methodology 306 that can provide results from comparing interactions across an enterprise.

In an embodiment, database 307 is configured to store aggregate metrics on a per-meeting basis as well alerts and recommendations derived from certain events (e.g., sudden drop in engagement) that occur over the course of a given interaction as well as events that occur repeatedly over multiple interactions (e.g., you reliably show up late).

Figure 4:
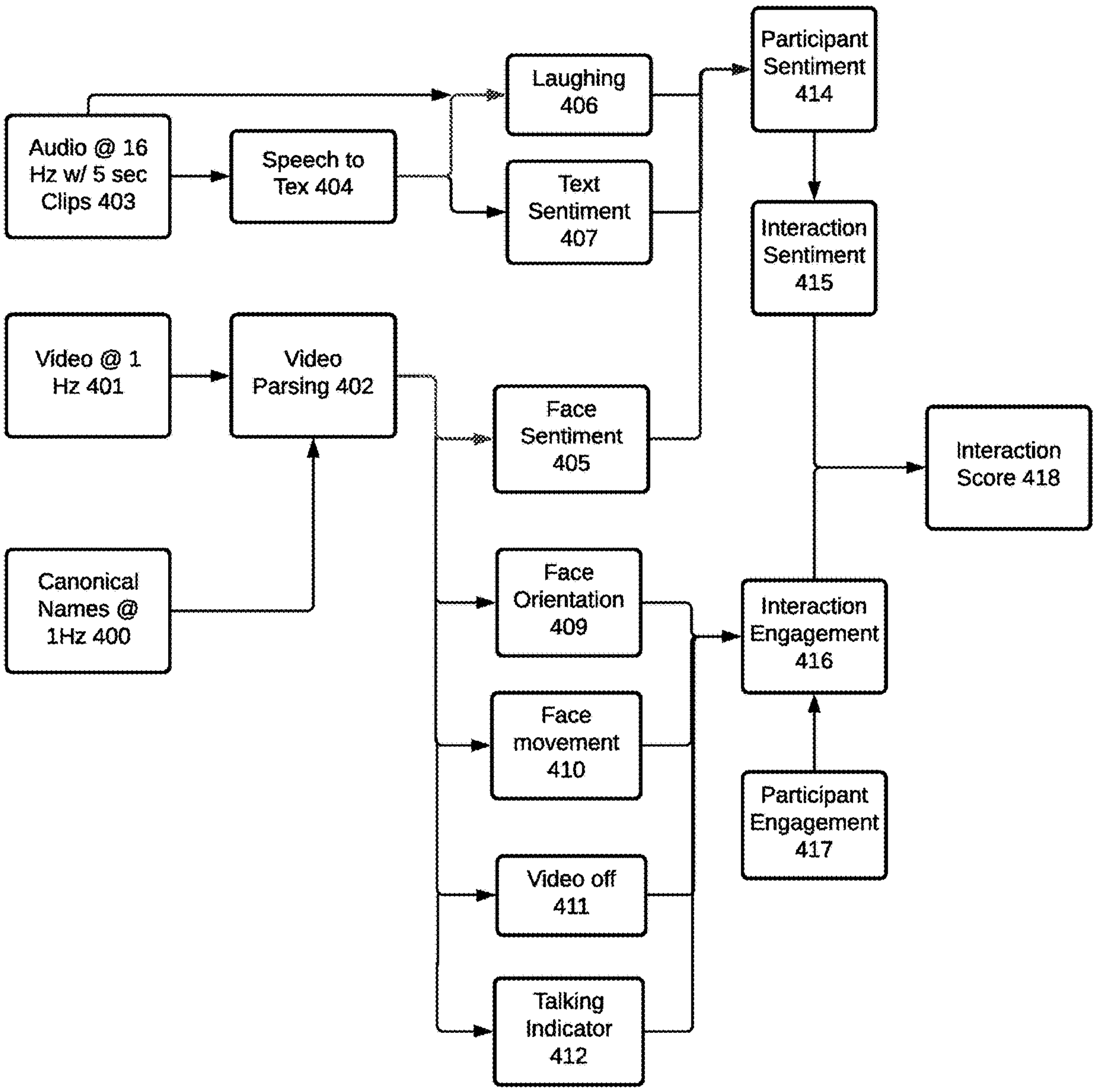
FIG. 4 is a block diagram of a functional representation of metric aggregations used in calculations by the System in FIGS. 1 and 2.

FIG. 4 is a block diagram of the analyzed aspects of the audio and video data, and is also of a functional representation of metric aggregations used in calculations by the System in FIG. 1. As shown in FIG. 4, in an embodiment, received, a list of canonical names 400 can be received to determine who are participants in the interaction. In addition, at 401, video can be collected via a video camera at a sampling rate of 1 Hz throughout the interaction, and is parsed into independent samples in 402. In an embodiment, the samples are viewport level. In an embodiment, the samples are participant level. In an embodiment, the samples are a combination of viewport level and participant level. The video parsing takes the raw video samples and identifies the individual participant viewports. In an embodiment, the video is parsed for a user's face orientation 409, face movement 410, whether the user's video is off at 411, whether the user is talking 412, or any combination of these aspects.

In an embodiment, at 403, audio data can be collected via a microphone and sampled at 16 Hz in, for example 5-second audio clips sampled throughout the interaction, converted to text at 404 for further analysis such as textual sentiment modeling and topic analysis, and the audio is analyzed to determine whether a user is laughing 406, or a user's text sentiment 407. In an embodiment, any combination of these analyses can be performed and used. Once the audio and video are analyzed, a quantitative model (e.g., a statistical machine learning model, an artificial intelligence model, a deep learning model, or a machine learning model) is applied to them and the results of the analysis are sent for post-processing aggregation and scoring. Once the post-processing aggregation is complete, the processor generates metrics, alerts, or recommendations for the user or users.

Once the video parsing 402 is performed, a participant visual feature analysis can be performed based on the participant-level video parsed from the raw video feed. For a given meeting or series of meetings, some or all of the following features may be analyzed:

In an embodiment, the video content is analyzed to determine a participant's face sentiment at 405. In an embodiment, the participant's face sentiment may be analyzed based on an AI model trained to detect positive vs. negative emotions of a given face. In an embodiment, this composite model first uses a deep learning based network model to detect the presence of a face in a viewport window and feeds the cropped face image to another deep learning based network model to determine the participant's emotions.

In an embodiment, face orientation and movement 406 are analyzed. These analyses look at the detected face in a viewport and, using programmed knowledge about faces, can determine whether the participant is looking at the camera, or an off-camera screen, as well as provide an estimate of the amount of head movement (e.g., head nods & shakes) over time. These calculations can then be used as inputs to calculate, for example, participant-level engagement metrics.

In an embodiment, text sentiment 407 can be analyzed by taking the textual output of the speech to text model, and by applying a text sentiment model to estimate the positive or negative tone of the conversation.

Other visual features that can be analyzed include name recognition, mute status, video-on status, talking status, and the presence of a feedback icon (for example, a thumbs up emoji or clapping emoji as is sometimes facilitated by a video and audio feed platform).

Once the audio parsing 403 is performed, a participant audio feature analysis can be performed based on the participant-level audio parsed from the raw audio feed. For a given meeting or series of meetings, some or all of the following features may be analyzed:

In an embodiment, the model can determine whether a participant is laughing 406. In an embodiment, this is performed by receiving raw audio clips, and applying a laugh detection model to be used in the analysis of a participant's sentiment (for example, laughing can indicate a positive sentiment).

Once the participant feature analyses are performed on the video and audio aspects of an interaction, a participant sentiment and engagement metrics analysis can be performed. In an embodiment, a participant sentiment analysis provides a metric that measures the positive vs. negative emotional state of a given participant and is an aggregation of the following inputs that are weighted to increase the accuracy against a human labeled dataset, including, but not limited to, face sentiment, laughter, textual sentiment, and voice prosody. In an embodiment, a participant engagement analysis can be used to provide a metric that measures the level of attention to the interaction of a given participant, and is an aggregation of some or all of the following inputs that are weighted to increase the accuracy against a human labeled dataset, including head orientation and movement, a video-on and muted status, a talking status, and a turn taking status.

While the metrics above are specific to a given participant, interaction sentiment and engagement metrics can be calculated to provide metrics for some or all participants in a given interaction. In an embodiment, interaction sentiment 415 can be calculated as an aggregation of the participant level sentiment measured across an interaction. The various participant-level metrics can be weighted in such a way as to maximize the accuracy of the interaction-level metric against a human labeled dataset.

In an embodiment, an interaction engagement metric 416 can be calculated as an aggregation of the participation level engagements measured across an interaction. The various participant-level metrics can be weighted in such a way as to maximize the accuracy of the interaction-level metric against a human labeled dataset.

Finally, in an embodiment, an interaction score 418 can be calculated by combining a combination of calculated sentiments and engagements, to determine the overall effectiveness of the interaction. The input metrics can be weighted in such a way as to maximize the accuracy of the interaction-level metric against a human-labeled dataset.

Figure 5:
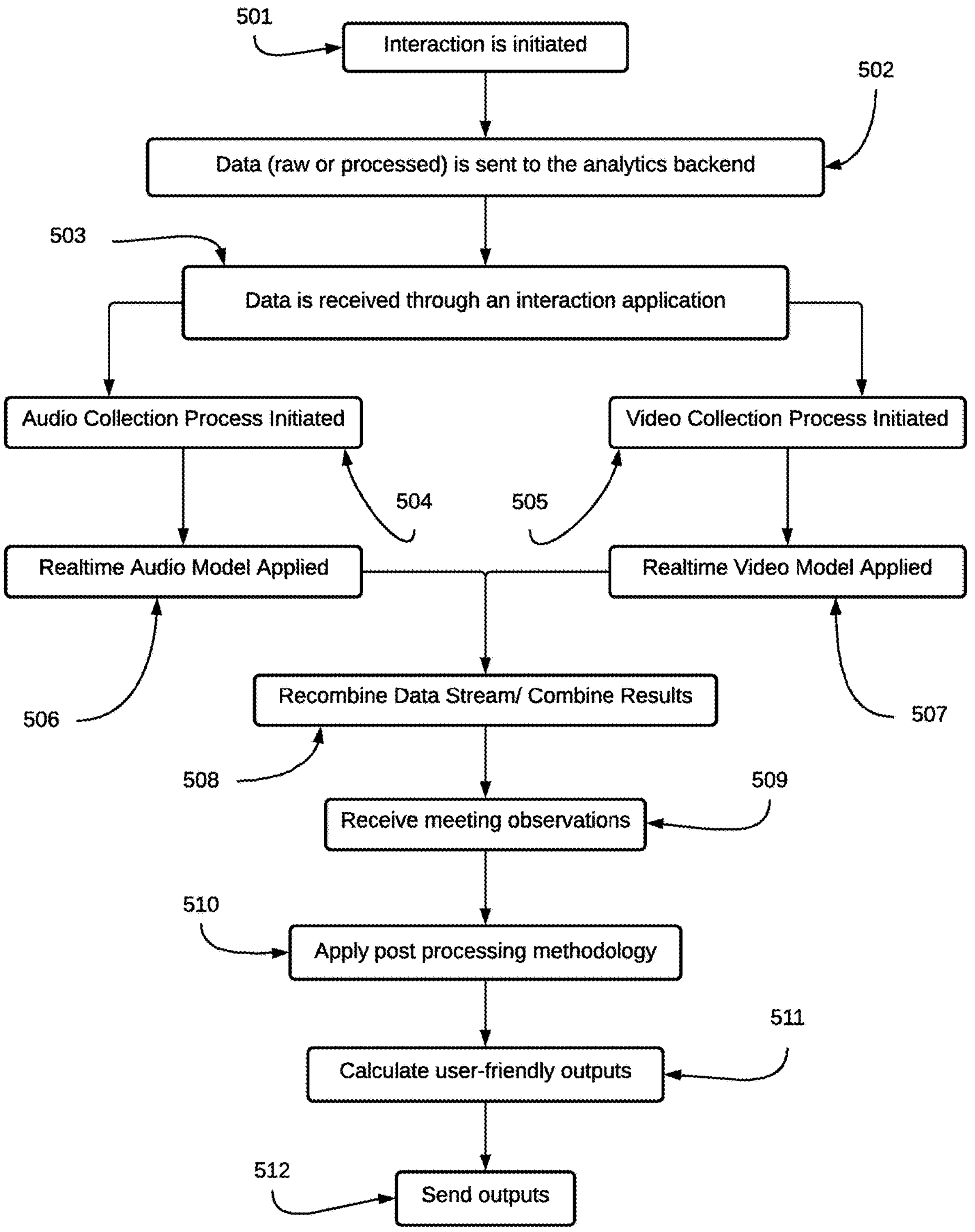
FIG. 5 is a flowchart of a method for calculating interaction outputs according to an embodiment of the invention.

FIG. 5 is a flowchart of a method for calculating interaction outputs according to an embodiment of the invention. At 501, an interaction is initiated. An interaction can include any interaction between a plurality of users, and can include online interactions (e.g., videoconferencing), or any other network-based interaction (e.g., a telephone call), or can be an in-person interaction (e.g., a physical in-person meeting) or a hybrid of online and physical meeting (e.g., a meeting where some participants are in a conference room).

Once the interaction is initiated, audiovisual data is captured and sent via a network to an analytics backend at 502. This can be done through any known method such as using a video camera to capture video, and using a microphone to capture audio.

At 503 the data is received by the interaction backend via an interaction application SDK, and once received, the audio collection process is initiated at 504 which peels off the audio data and sends it to the realtime audio model at 506, where the various aspects of audio data are processed and scored. Examples (but not the only examples) of audio aspects being processed and scored include whether a user is laughing, and a user's text sentiment.

At 505, video data is peeled off the received data and sent, at 507, to the realtime video model where various aspects of video data are processed and scored. Examples (but not the only examples) of video data include face sentiment, face orientation, face movement, whether a user's video is off, or whether a user is talking.

At 506 and 507, the audio data and video data, respectively, are applied a score based on a time stamp within the data, and at 508, the audio and video streams are recombined to a single stream with their time stamps matching up, so a score can be viewed over time for each of the analyzed audio and video aspects.

At 509, these scores, or observations, are sent to a database, which provides them to a processor at 510 for post processing aggregation. Once the data is aggregated and analyzed at 510, then at 511, the processor can calculate user-friendly outputs, such as metrics, alerts, and recommendations. The outputs can be presented in real time, or can be presented after the meeting to determine the efficacy of that meeting, or of a series of meetings.

Figure 6:
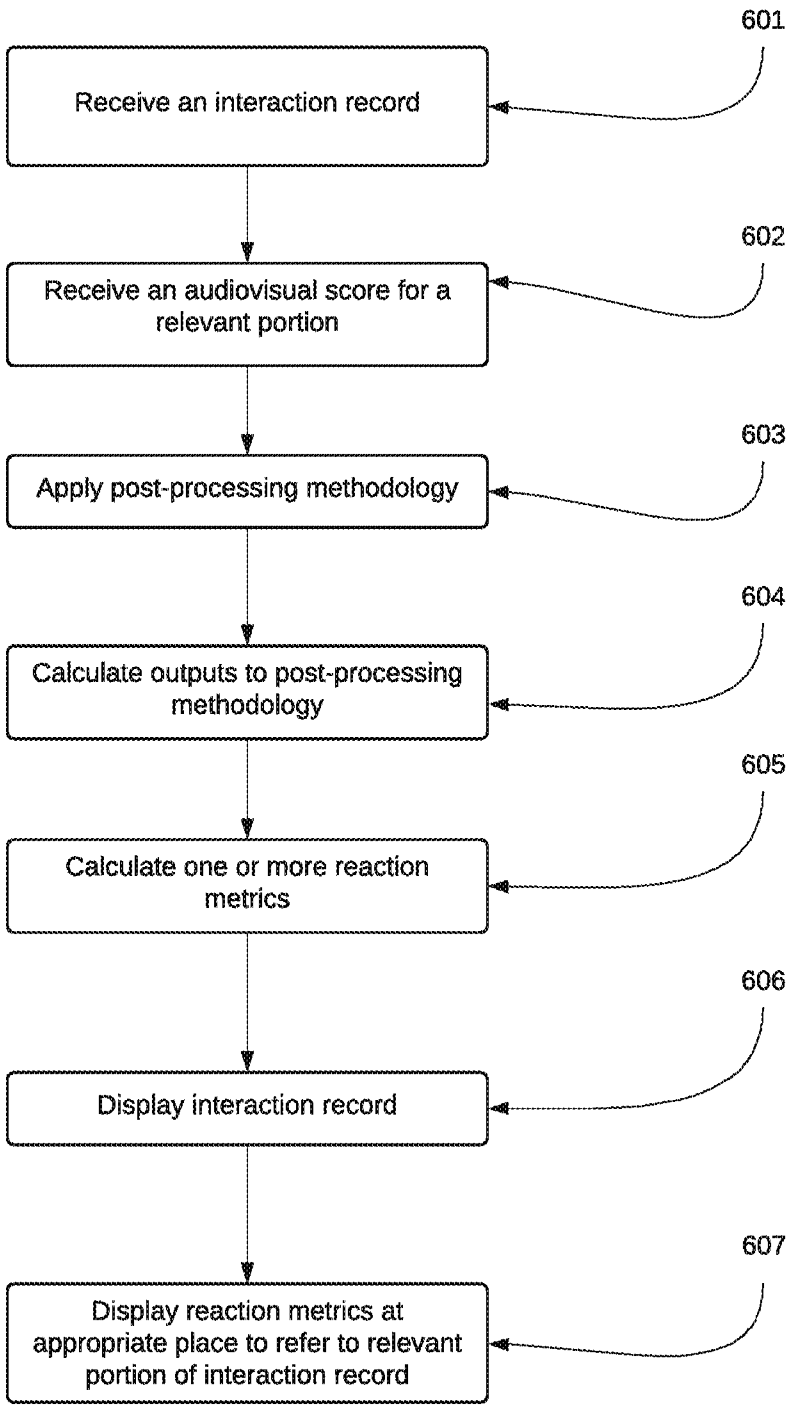
FIG. 6 is a flowchart of a method for displaying reaction metrics in a relevant portion of an interaction method, according to an embodiment.

FIG. 6 is a flowchart of a method for displaying reaction metrics in a relevant portion of an interaction method, according to an embodiment. At 601, an interaction record is received at a backend processor, for at least a portion of an interaction. The interaction record may be a transcript of an interaction that has taken place, an audio or video recording of an interaction that has taken place, or an audiovisual recording (i.e., a recording including both audio and video data) of an interaction that has taken place.

For a relevant portion of the interaction (i.e., the portion of the interaction under investigation or question), an audiovisual score is received at 602. The audiovisual score embodies the audio and/or video results calculated as described in this document, and is based on data received from at least a subset of participants in the interaction during the interaction. In an embodiment, the data can be data that has been received from a speaker in the relevant portion of the interaction. In an embodiment, the data can be data received from at least a subset of listeners in the relevant portion of the interaction. In an embodiment, the data can be data received from a combination of the speaker along with at least a subset of listeners in the relevant portion of the interaction. In an embodiment, the data can include data that has been received from previous interactions.

At 605, a reaction metric is calculated based on the received audiovisual score. In an embodiment, a reaction metric can include Engagement, Sentiment, or a Meeting Score at the individual level or group level, but without including input from the speaker. (E.g., in the case where a speaker is trying to sell a product, the speaker may make very positive statements and act in a very engaged way, but the reactions from the buyer or buyers may include eye rolling, distracted glances, angry faces. Thus, the speaker's reactions are filtered out of the determination of reaction metric in this case.)

In an embodiment, the reaction metric is specific to the relevant portion of the interaction, or a subset thereof. For example (but not the only example), in an interaction, a single speaker may be presenting to other participants in the interaction, and one desires to see how the listeners (or a subset of listeners) reacted to certain part of the presentation. To do this, at the relevant point in the interaction, the reaction metric can be calculated using the audiovisual score as calculated for that portion of the interaction.

Note that, instead of calculating a reaction metric based directly on the audiovisual scores, at 603, post-processing methodologies may first be applied to the audiovisual scores, as discussed in this document. Then, at 604, the outputs of the applied post-processing methodology are calculated, and at 605, the one or more reaction metrics can be calculated by taking into account the calculated outputs of the post-processing methodology.

At 606, the interaction record, or a portion thereof, can be displayed, and at 607, the calculated reaction metrics that apply to a specific time or a specific statement in the interaction record can be displayed alongside the interaction record. In an embodiment, the displayed combination of the interaction record and the relevant portion of the reaction metric are juxtaposed, or displayed proximate to each other.

Figure 7:
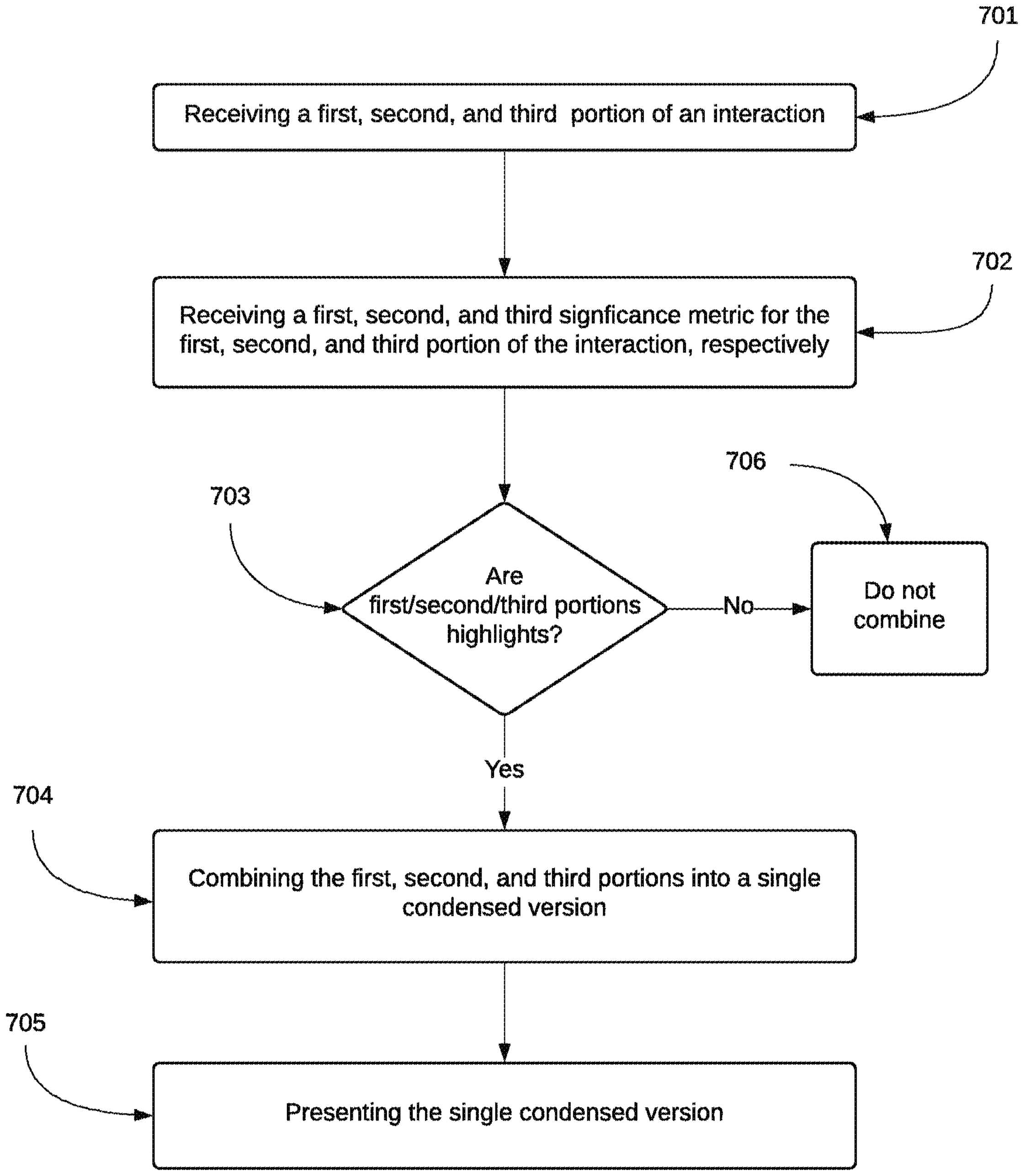
FIG. 7 is a flowchart of a method for presenting a condensed version of an interaction record, according to an embodiment.

FIG. 7 is a flowchart of a method for presenting a condensed version of an interaction record, according to an embodiment. At 701, a number of portions of an interaction are received at a backend processor. In an embodiment, the entire interaction (or a subset thereof) can be received and divided up into a number of portions. In an embodiment, the number of portions may be predetermined by the user. In an embodiment, the number of portions may be based on any combination of the following: dividing the interaction up by speaker, or by topic, or by time, a non-speaking participant, a grouping of participants (e.g., client vs. vendor); a score (e.g., high or low sentiment, sentiment, engagement, reactions); statements with high or low scores.

As an example, in 701, three portions of an interaction are received, and at 702, each portion is assigned a significance metric. That is, the first portion is assigned a first significance metric, the second portion is assigned a second significance metric, and the third portion is assigned a third significance metric. In an embodiment, each portion receives a different significance metric. In an embodiment, each portion receives the same significance metric. In an embodiment, two of the portions may be assigned the same significance metric, while the third portion may be assigned a different significance metric. In an embodiment, the significance metric is a numerical score based on some combination of a meeting score, a sentiment score, engagement, score, and/or any other metric that can be applied to the interaction.

At 703, the received portions of the interaction are processed to determine if they are a highlight of the meeting. For the purposes of the present invention, a highlight is a moment within an interaction that stands out based on features built into some combination of a meeting score, sentiment, and/or an engagement metric. Interactions can be measured from at least one of the following: a transcript, an audio recording, a video recording, or an audiovisual recording. One skilled in the art will understand that highlights can be pivotal and/or interesting moments that may correspond to discrete events, such as the start of a presentation or questions being asked, or they can be based on extreme levels and/or changes in affective metrics (e.g., high levels of agreement or disagreement or a sharp decrease in sentiment).

If portions of an interaction are not a highlight, they can be discarded (i.e., not included in a highlight reel). If portions are calculated to be a highlight, they are combined at 704 into a condensed version of the interaction record (the highlight reel). In an embodiment, the highlight reel is designed to represent a condensed version of the full interaction. At 705, the single condensed version of the interaction record can be presented to a user.

Figure 8:
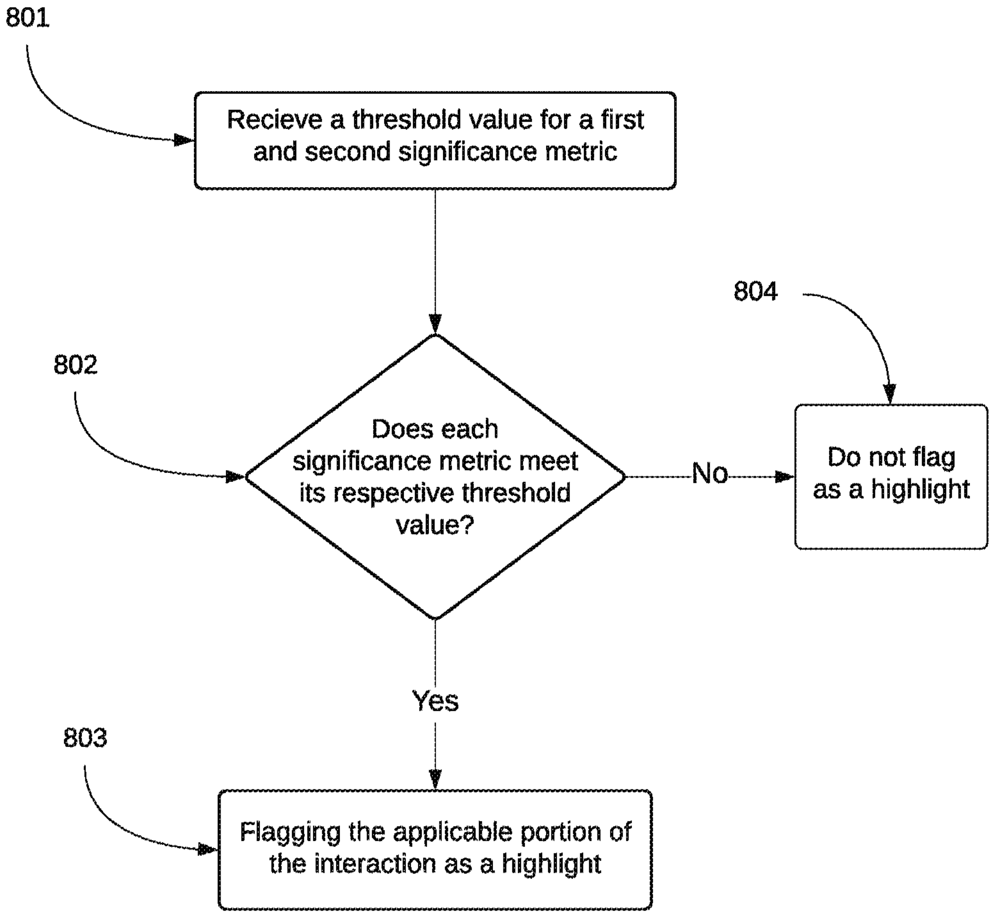
FIG. 8 is a flowchart of a method for determining highlights of an interaction, according to an embodiment.

FIG. 8 is a flowchart of a method for determining highlights of an interaction, according to an embodiment. At 801 a threshold value is received for at least one significance metric. In an embodiment, each portion of the interaction can have its own significance metric, or can share overlapping significance metrics. The threshold value can be set by a user, or by an artificial intelligence (AI) calculation. At 802, a determination is made as to whether each significance metric meets its respective threshold value. If not, the relevant portion of the interaction is not flagged as a highlight. If a significance metric for a portion of the interaction does, indeed meet its threshold value, then that portion is flagged as highlight for inclusion in a highlight reel.

In an embodiment, instead of setting a threshold value for determining a highlight, a user may desire to select the "n"

interaction portions with the highest calculated significance metric for inclusion in the highlight reel, where "n" is an integer greater than zero.

While certain embodiments have been shown and described above, various changes in form and details may be made. For example, some features of embodiments that have been described in relation to a particular embodiment or process can be useful in other embodiments. Some embodiments that have been described in relation to a software implementation can be implemented as digital or analog hardware. Furthermore, it should be understood that the systems and methods described herein can include various combinations and/or sub-combinations of the components and/or features of the different embodiments described. For example, types of data or components described in relation to certain processes can be applicable in other contexts. Thus, features described with reference to one or more embodiments can be combined with other embodiments described herein.

Although specific advantages have been enumerated above, various embodiments may include some, none, or all, of the enumerated advantages. Other technical advantages may become readily apparent to one of ordinary skill in the art after review of the following figures and description.

It should be understood at the outset that, although exemplary embodiments are illustrated in the figures and described above, the present disclosure should in no way be limited to the exemplary implementations and techniques illustrated in the drawings and described herein.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

We claim:

1. A method for determining highlights of interactions, the method comprising:

receiving a first portion of an interaction record;

receiving a second portion of the interaction record;

receiving a first numerical metric value for the first portion of the interaction record;

receiving a second numerical metric value for the second portion of the interaction record;

calculating, using the first numerical metric value, whether the first portion of the interaction record is a highlight by determining whether the first numerical metric value s a first threshold value;

calculating, using the second numerical metric value, whether the second portion of the interaction record is a highlight by determining whether the second numerical metric value satisfies a second threshold value;

responsive to the first portion of the interaction record and the second portion of the interaction record each calculated to be a highlight, combining the first portion of the interaction record with the second portion of the interaction record into a condensed version of the interaction record; and presenting the condensed version of the interaction record on a user interface of a computing device in at least one of: a transcript, an audio format, a video format, or an audiovisual format.

2. The method of claim 1, further comprising:

receiving a third portion of the interaction record;

receiving a third numerical metric value for the third portion of the interaction record;

calculating, using the third numerical metric value, whether the third portion of the interaction record is a highlight;

responsive to the third portion of the interaction record being calculated to be a highlight, combining the third portion of the interaction record into the condensed version of the interaction record.

3. The method of claim 1, wherein one or more of: the first numerical metric value or the second numerical metric value is calculated using at least one of: a meeting score, a sentiment score, or an engagement score.

4. The method of claim 1, wherein the first portion and the second portion are determined to be a highlight by:

receiving a first threshold value for the first numerical metric value;

receiving a second threshold value for the second numerical metric value;

determining whether the first numerical metric value satisfies the first threshold value;

determining whether the second numerical metric value satisfies the second threshold value;

responsive to the first numerical metric value satisfying the first threshold value, indicating the first portion of the interaction record as a highlight; and responsive to the numerical metric value satisfying the second threshold value, indicating the second portion of the interaction record as a highlight.

5. The method of claim 1, wherein the first numerical metric value and the second numerical metric value are determined using at least one of: participant engagement, participant sentiment, audio sentiment, video sentiment, facial expressions, voice tone, or textual sentiment.

6. The method of claim 1, wherein one or more of: the first numerical metric value or the second numerical metric value are determined using one or more machine learning models, wherein the one or more machine learning models are configured to identify highlights using changes in values of one or more affective metrics of the interaction record, wherein the one or more affective metrics include at least one of: level of agreement, level of disagreement, or sentiment of an interaction associated with the interaction record.

7. The method of claim 1, further comprising:

wherein one or more of: the first numerical metric value or the second numerical metric value are determined using at least one of:

a beginning of an event depicted within the interaction record, or an end of the event depicted within the interaction record.

8. One or more non-transitory, computer-readable storage media storing instructions for determining highlights of an interaction record, wherein the instructions when executed by at least one data processor of a computing system, cause the computing system to:

receive one or more portions of the interaction record;

for each particular portion of the one or more portions of the interaction record:

receive a metric value of the particular portion of the interaction record, and calculate, using the received metric value, whether the particular portion of the interaction record is a highlight by determining whether the received metric value satisfies threshold value;

responsive to at least two portions of the interaction record each calculated to be a highlight, combine the at least two portions of the interaction record into a condensed version of the interaction record; and present the condensed version of the interaction record on an interface of a computing device in at least one of: a transcript, an audio format, a video format, or an audiovisual format.

9. The one or more of non-transitory, computer-readable storage media of claim 8, wherein the interaction record is a video conference, and wherein the metric values are derived in real-time of one or more of: video feeds or audio feeds of the interaction record.

10. The one or more of non-transitory, computer-readable storage media of claim 8, wherein the interaction record is a current interaction record, wherein the instructions further cause the computing system to:

compare the metric values of the one or more portions of the current interaction record with historical metric values of previous interaction records occurring prior to the current interaction;

using the comparison, identify at least one of: trends or patterns in one or more of: participant engagement or sentiment.

11. The one or more of non-transitory, computer-readable storage media of claim 8, wherein the instructions further cause the computing system to:

receive a weight for each metric value;

apply the received weights to the metric values; and calculate the highlights using the weighted metric values.

12. The one or more of non-transitory, computer-readable storage media of claim 8, wherein the instructions further cause the computing system to:

divide the interaction record into a number of portions using at least one of: a speaker, a topic, a time, a non-speaking participant, a grouping of participants, a sentiment of one or more participants, an engagement of the one or more participants, or a reaction of the one or more participants.

13. The one or more of non-transitory, computer-readable storage media of claim 8, wherein the instructions further cause the computing system to:

assign the metric value to each portion of the interaction record using a combination of a meeting score, a sentiment score, and an engagement score.

14. The one or more of non-transitory, computer-readable storage media of claim 8, wherein the instructions further cause the computing system to:

receive a user-defined number of portions to divide the interaction record into; and divide the interaction record into the user-defined number of portions.

15. A system for determining highlights of an interaction record, the system comprising:

at least one hardware processor; and at least one non-transitory memory storing instructions, which, when executed by the at least one hardware processor, cause the system to:

receive one or more portions of the interaction record;

for each particular portion of the one or more portions of the interaction record:

receive a metric value of the particular portion of the interaction record, and calculate, using the received metric value, whether the particular portion of the interaction record is a highlight by determining whether the received metric value satisfies a threshold value;

responsive to at least one portion of the interaction record calculated to be a highlight, aggregating the at least one portion of the interaction record calculated to be a highlight into a condensed version of the interaction record; and present the condensed version of the interaction record on an interface of a computing device in at least one of: a transcript, an audio format, a video format, or an audiovisual format.

16. The system of claim 15, wherein the system is further caused to:

perform a longitudinal analysis of the interaction record by comparing the metric values of the one or more portions of the interaction record with scores from historical interaction records.

17. The system of claim 15, wherein the system is further caused to:

perform an enterprise analysis by comparing the metric values of the one or more portions of the interaction record with scores from other interaction records within an enterprise of the interaction record.

18. The system of claim 15, wherein the system is further caused to:

display the metric values of the one or more portions of the interaction record in a location adjacent to corresponding portions of the interaction record.

19. The system of claim 15, wherein the one or more portions of the interaction record have greater metric values than other portions of the interaction record.

20. The system of claim 15, wherein the system is further caused to:

using the metric values of the one or more portions of the interaction record, generate one or more of: metrics, alerts, or recommendations.

* * * * *